Feb. 4, 1947. A. V. BEDFORD 2,415,157
SERVO CAM FOLLOWER
Filed March 30, 1945
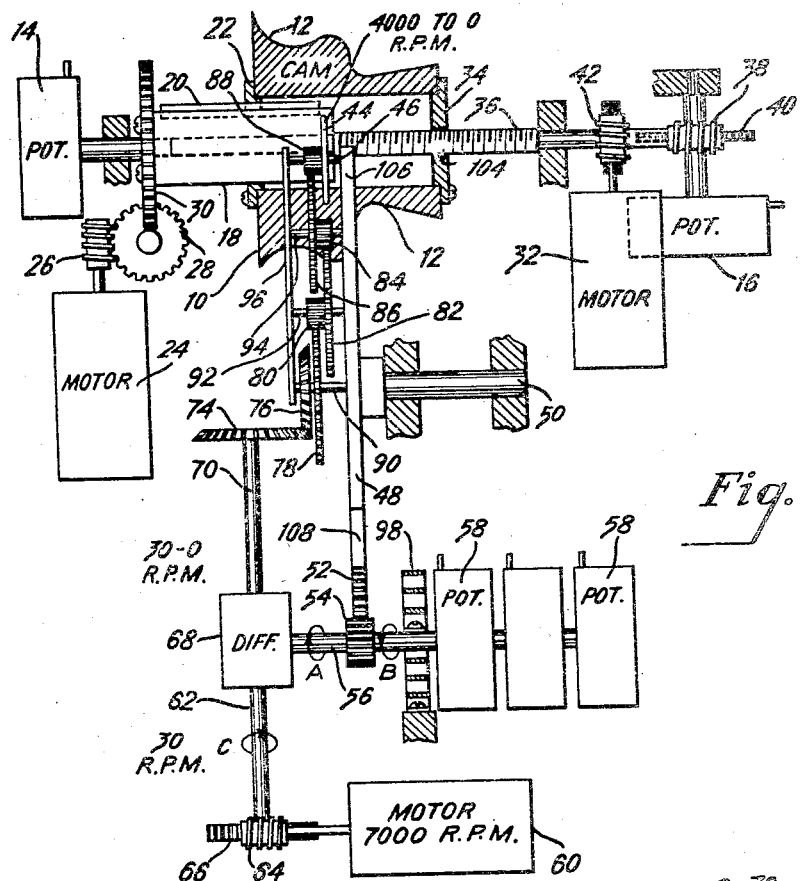
*Fig. 1*
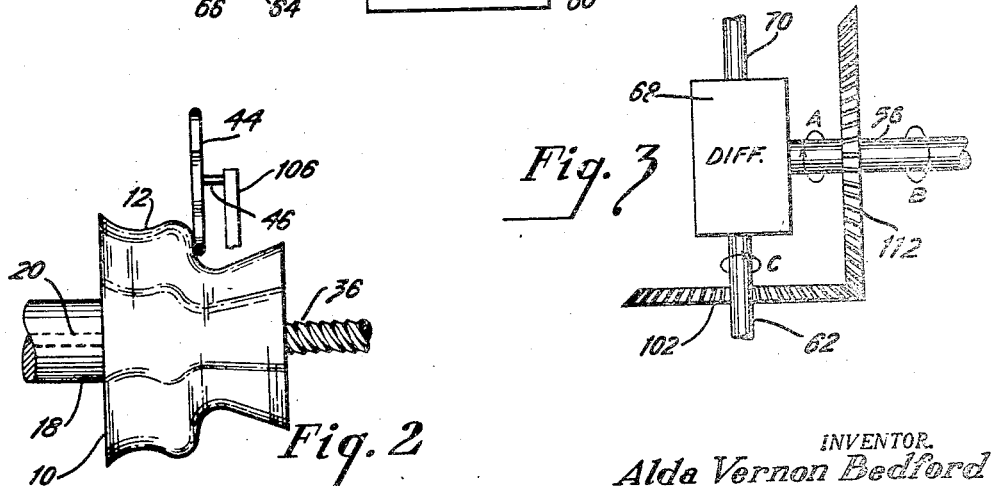
*Fig. 2*
*Fig. 3*
INVENTOR.
Alda Vernon Bedford
BY
ATTORNEY.

UNITED STATES PATENT OFFICE 2,415,157

SERVO CAM FOLLOWER

Alda V. Bedford, Princeton, N. J., assignor to Radio Corporation of America, a corporation of Delaware Application March 30, 1945, Serial No. 585,735

10 Claims. (Cl. 74—388)

This invention relates to cams and cam followers, and more particularly to devices using those elements in which a load is to be driven in accordance with the movement of a cam follower wheel in engagement with the surface of a cam.

One object of the invention is to procure fast and accurate tracking of a cam follower on the surface of a cam, notwithstanding that considerable load is to be driven in response to movement of the cam follower.

Another object of the invention is to drive a load precisely and speedily in accordance with the movement of a cam follower wheel in engagement with a cam surface and without loading the cam follower wheel or any elements directly connected therewith.

A third object of the invention is to provide an improved computing device for obtaining an output as an accurate function of two independent variables.

These objects are achieved according to the invention by employing a motor or other extraneous source of power to drive the load and controlling the torque applied to the load by the motor, in accordance with variations in friction between the cam follower wheel and the cam. In addition, the load is so connected as to reduce that friction to a minimum. The device may, therefore, be regarded as a closed cycle or servo system. In one sense, it may be said that the load drives the cam instead of the cam driving the load.

The invention may be better understood from a consideration of the following description of two embodiments thereof when read in conjunction with the accompanying drawing in which:

Figure 1 is a view partly in section of a computing device embodying the invention, Figure 2 is a view of the cam and cam follower wheel of Figure 1, in a different position relative to each other from that shown in Fig. 1, and Figure 3 is a view of part of the device of Fig. 1, according to an alternative embodiment of the invention.

Fig. 1 illustrates a computing device from which there is to be obtained a mechanical output, such as a shaft position, as a function of two independent variables. For the purpose of this description, the variables may be regarded as voltages derived from potentiometers 14 and 16, respectively. The manner in which the actually varying quantities are converted into voltages is well known and is not essential to the present invention. The computer includes a three-dimensional cam 10 having an irregular surface 12. The cam is mounted on a camshaft 18 by means of a key 20 which engages a member 22 secured to the cam. A motor 24 drives the camshaft through gears 26, 28 and 30. The rotation of the armature of the motor is controlled by the voltage derived from the potentiometer 14.

A nut 34 secured to the cam 10 is provided with an internally threaded aperture 104 adapted to receive a screw 36. A second motor 32 drives the screw 36 through gears 42. The rotation of the armature of the motor 32 is controlled by voltage derived from the potentiometer 16, which is driven from the screw 36 by gears 38 and 40. The cam is thus rotated in one plane about the camshaft in accordance with one variable represented by the voltage across the potentiometer 14, and is moved axially in another plane in accordance with another variable represented by the voltage across the potentiometer 16.

A cam follower wheel 44 is arranged in conventionally operative relation with the cam 10, that is to say, with the edge of the cam follower engaging the cam surface. As will appear later, considerable acceleration is imparted to the cam follower; and in order for the device to follow the convolutions of the cam surface accurately, it is desirable that the inertia of the cam follower shall be at a minimum. For this reason the cam follower wheel may be spoked instead of solid. The follower is mounted upon a shaft 46 to which is secured one end 106 of an elongated cam follower arm 48. This arm is pivoted at some point between its ends on a shaft 50. The other end 108 of the cam follower arm bears a gear segment 52 in operative relation with a gear 54 mounted on a load shaft 56. This shaft in turn operates one or more potentiometers 58, representing the output of the computing device. The cam surface 12 is of such shape that when the cam follower wheel 44 just engages that surface, the arm 48 will move in accordance with a desired function of the two variables.

The load shaft 56 and potentiometers 58 may present considerable load to the system thus far described. If, therefore, the cam follower arm 48 is required to drive the load shaft 56 directly through the gearing 52—54, considerable strain will be set up in the system. This may result in stalling of the motors 24 or 32, or in injury to the cam surface. In Fig. 2, for example, the cam follower wheel may be at the base of a steeply sloping portion of the surface 12. Axial movement of the cam, due to rotation of the screw 36, may urge the cam follower wheel 44 with considerable force against that steeply sloping portion. The force may be so great as to break the cam follower wheel. At best, the parts will flex and the output will not accurately represent the desired function of the two variables.

A motor 60 of reasonably uniform speed is therefore provided to drive the load. The motor may be of the direct current type having a permanent magnet field. It drives a shaft 62 in one direction, say, in that of the arrow C through gears 64—66. The shaft 62 is connected to a differential gear 68 and may be regarded as an input shaft to that gear. The differential is also connected to the load shaft 56 and to a third shaft 70 which drives the cam follower wheel 44 through a chain of speed-raising gears 74, 76, 78, 80, 82, 84, 86 and 88. The last of these gears 88 is mounted on the shaft 46 which also supports the cam follower wheel, the others being mounted on shafts 90, 92, 94 maintained by an appropriate support 96.

At the same time a strong spring 98, which may be of the clock type, is arranged to urge the load shaft 56 in the direction of the arrow B.

The operation of the device is as follows: The rotation imparted to the shaft 62 by the motor 60 is transferred to the shaft 70 through the differential. This in turn drives the cam follower wheel at a speed which is high by comparison with that of the shaft 70 through the gear chain 74-88 inclusive. Any movement, however, of the cam with respect to the cam follower which increases the friction between these two elements—caused by any variation in the voltage derived from potentiometers 14 or 16—imparts a restraining or braking pressure on the shaft 70. Because the gears 74-88 drive the cam follower wheel at a high speed, very little friction at the surface of that wheel provides a high braking action upon the shaft 70.

Restraint of the shaft 70 transfers the rotation of shaft 62 to the load shaft 56, which is now driven in the direction of the arrow A as a function of the friction between the surfaces of the cam follower wheel and the cam. The cam and cam follower, together with the gear chain 74-88, may be regarded as a brake for the shaft 70. This brake combined with the differential 68 acts as a clutch to transfer the rotational motion of the input shaft 62 to the load shaft 56.

Through the intervention of the gear 54 and the gear segment 52, the rotation of the load shaft as described causes the lower end 108 of the cam follower arm to move in an anticlockwise direction, looking from the right of the drawing. Since the arm is pivoted on shaft 50 this lifts the cam follower wheel away from the cam surface until friction between the wheel and the cam surface is reduced to a small value and the two elements move together substantially in step.

Conversely, when the relative movement of the cam and the cam follower is such as to disengage one from the other, the braking force applied to shaft 70 is negligible. Substantially no motion is transferred from the motor 60 to the load shaft, and the torque of the spring 98 is strong enough to drive the load shaft in the direction shown by the arrow B. This in turn moves the lower end of the follower arm up from the plane of the drawing and presses the follower wheel against the cam surface, whereupon the braking action before described again takes control.

When, however, there is no relative movement between the cam and cam follower, a condition of equilibrium obtains; that is to say, the torque applied to the load shaft by the spring 98 is equal and opposite to the friction-controlled torque applied to that shaft by the motor 60, when the gear ratios are taken into account. When that condition obtains, the rotational speed of the follower wheel is approximately one-half of what it would be if all the energy of the motor 60 were transferred directly through the various gears and shafts to the cam follower wheel and none were by-passed to the load shaft.

The load shaft 56 and load 58 will thus always be driven in proportion to the friction between the cam and cam follower; that is to say, in accordance with the engagement of the cam follower wheel with the cam surface. This represents the desired function of the two independent variables. No load is presented to the cam or to any element directly associated with it, because all the energy to drive the output is derived from the motor 60. Moreover, the gearing between the load and cam follower arm operates constantly to return the cam and cam follower to a position at which friction between their surfaces is low.

In the embodiment of Fig. 3, the spring 98 is replaced by gears 102 and 112. The gear 102 is frictionally connected to the shaft 62, as for example by a slipping clutch, so that part of the constant torque imparted to this shaft by the motor 60 is transferred to the load shaft to drive the latter in the direction of the arrow B, thus achieving the same effect as the spring 98.

There has thus been described a system for driving a load in accordance with the engagement between a cam follower wheel and a cam surface, but without substantially loading the cam follower or any elements directly associated therewith. The driving force is derived from a motor or other source of power and the torque applied by the motor to the load is controlled by appropriate gearing in response to variations in friction between the surfaces of the cam and the cam follower. Further gearing serves to reduce that friction to a minimum in response to rotation of the load. The cam follower wheel thus tracks the cam surface quickly and accurately and the movements of the cam follower wheel engaging that surface are reproduced in the movements of the load. The invention finds particular, although not exclusive, application in a computer in which a three-dimensional cam moves rotationally and axially in accordance with two independent variables, while the cam surface is a desired function of those variables.

I claim as my invention:

1. In combination a cam, a cam follower wheel in operative relation with the cam, a load shaft, means including a motor for applying torque to the shaft to drive the same, and means responsive to variations in friction between the surfaces of the cam follower wheel and the cam for controlling the torque applied by the motor to the shaft.

2. In combination a cam, a cam follower wheel in operative relation with the cam, a load shaft, means including a motor for applying torque to the shaft to drive the same, means responsive to rotation of the load shaft for varying the engagement of the cam follower wheel with the cam, and means responsive to variations in friction between the surfaces of the cam follower wheel and the cam for controlling the torque applied by the motor to the shaft.

3. In combination a cam, a cam follower wheel in operative relation with the cam, a differential gear having an input shaft, a load shaft and a third shaft, a motor drivingly connected to the input shaft, a chain of speed-increasing gears connecting said third shaft and the cam follower wheel whereby to apply braking pressure to said shaft in response to variations in friction between the surfaces of the cam follower wheel and the cam, and means responsive to rotation of the load shaft for varying the engagement of the cam follower wheel with the cam.

4. In combination a cam, a cam follower wheel in operative relation with the cam, an input shaft, a load shaft and a third shaft, a differential gear connecting said shafts and adapted to rotate said third shaft in response to rotation of said input shaft and to rotate said load shaft in one direction upon restraint of said third shaft, a motor drivingly connected to the input shaft, a chain of gears connecting said third shaft and said cam follower wheel, means for applying torque to said load shaft in opposition to that applied thereto by said motor through said differential gear, and means responsive to rotation of the load shaft for varying the engagement of the cam follower wheel with the cam.

5. The combination of a cam, a cam follower wheel in operative relation with the cam, a pivoted cam follower arm secured to the cam follower wheel, a load shaft, gearing connecting said shaft to said arm for varying the engagement of the cam follower wheel with the cam, a source of power for driving the shaft, and means responsive to variations in friction between the surfaces of the cam follower wheel and the cam for controlling the torque applied to said shaft by said source.

6. A system for driving a load shaft in accordance with the movement of a cam follower wheel in engagement with the surface of a cam, comprising in addition to said cam and said load shaft, a cam follower wheel in operative relation with the cam, means for imparting torque to said shaft to urge the same in one direction, a source of power effectively connected to said shaft to drive the same in the opposite direction, and means responsive to variations in friction between said cam follower wheel and the cam surface for controlling torque applied to said shaft from said source, the elements of said system being so adjusted as to establish effective equilibrium between the torque applied to said shaft by said torque-imparting means and said source of power respectively when friction between said cam follower wheel and said cam is substantially at a minimum.

7. The combination of a cam, a cam follower wheel in operative relation with the cam, a differential gear having an input shaft, a load shaft and a third shaft, a source of power drivingly connected to the input shaft, and gearing connecting said cam follower wheel to said third shaft for braking said third shaft in accordance with friction between said cam follower wheel and said cam, whereby to control the transmission of power from said input shaft to said load shaft in accordance with said friction.

8. The combination of a cam, a cam follower wheel in operative relation with the cam, an elongated cam follower arm secured at one end thereof to the cam follower wheel and pivoted between its ends, an input shaft, a load shaft and a third shaft, a motor connected to the input shaft to drive the same in a predetermined direction, a chain of speed-raising gears connecting the third shaft to the cam follower wheel, a differential gear so connecting said shafts as to drive the load shaft in one direction upon restraint of said third shaft, and in response to the drive imparted to said input shaft by said motor, a spring associated with said load shaft for urging the same in a direction opposite to that imparted thereto through said differential gear, and gearing connecting said load shaft to the other end of said cam follower arm.

9. In a computing device a cam shaft, a cam mounted on said camshaft, means for rotating said cam about said camshaft in accordance with one variable, means for moving said cam axially with respect to said shaft in accordance with another variable, a cam follower wheel in operative relation with the cam, a load shaft, means including a motor for applying torque to the load shaft to drive the same, and means responsive to variations in friction between the surfaces of the cam follower wheel and the cam for controlling the torque applied by the motor to the load shaft.

10. In a computing device a three-dimensional cam having a surface representative of a function of two independent variables, means for moving said cam in two different planes in accordance with said variables respectively, a cam follower wheel in operative relation with said surface, a load shaft, means including a motor for applying torque to the load shaft to drive the same, and means responsive to variations in friction between the surfaces of the cam follower wheel and the cam for controlling the torque applied by the motor to the load shaft.

ALDA V. BEDFORD.

REFERENCES CITED

The following references are of record in the file of this patent:

UNITED STATES PATENTS

| Number | Name | Date |
| --- | --- | --- |
| 2,116,323 | Papello | May 3, 1938 |
| 2,065,014 | Nichols | Dec. 22, 1936 |
| 2,196,064 | Erban | Apr. 2, 1940 |
| 2,101,844 | Fraser | Dec. 14, 1937 |